US007793503B2

(12) United States Patent
Grote et al.

(10) Patent No.: US 7,793,503 B2
(45) Date of Patent: Sep. 14, 2010

(54) HEAT SHIELD BLOCK FOR LINING A COMBUSTION CHAMBER WALL, COMBUSTION CHAMBER AND GAS TURBINE

(75) Inventors: Holger Grote, Bonn (DE); Andreas Heilos, Mülheim (DE); Marc Tertilt, Hattingen (DE)

(73) Assignee: Siemens Aktiengesellschaft, Munich (DE)

( * ) Notice: Subject to any disclaimer, the term of this patent is extended or adjusted under 35 U.S.C. 154(b) by 933 days.

(21) Appl. No.: 10/569,349

(22) PCT Filed: Jul. 26, 2004

(86) PCT No.: PCT/EP2004/008357

§ 371 (c)(1), (2), (4) Date: Feb. 22, 2006

(87) PCT Pub. No.: WO2005/022061

PCT Pub. Date: Mar. 10, 2005

(65) Prior Publication Data

US 2007/0000252 A1 Jan. 4, 2007

(30) Foreign Application Priority Data

Aug. 22, 2003 (EP) ................................ 03019093

(51) Int. Cl.
*F02C 1/00* (2006.01)

(52) U.S. Cl. ........................................ 60/754; 60/752

(58) Field of Classification Search ........... 60/752–760; 428/212, 219, 318.4, 310.5, 310.6
See application file for complete search history.

(56) References Cited

U.S. PATENT DOCUMENTS

| | | | | |
|---|---|---|---|---|
| 3,623,711 | A * | 11/1971 | Thorstenson | 60/754 |
| 4,835,831 | A | 6/1989 | Melton | |
| 4,840,131 | A | 6/1989 | Meumann et al. | |
| 5,682,596 | A * | 10/1997 | Taylor et al. | 428/552 |
| 6,182,451 | B1 * | 2/2001 | Hadder | 60/732 |
| 6,330,791 | B1 * | 12/2001 | Kendall et al. | 60/39.11 |
| 6,630,423 | B2 * | 10/2003 | Alvin et al. | 502/325 |
| 6,948,437 | B2 | 9/2005 | Hofmann et al. | |
| 2004/0050060 | A1 | 3/2004 | Taut | |

FOREIGN PATENT DOCUMENTS

| | | | |
|---|---|---|---|
| DE | 1 904 373 | | 9/1969 |
| EP | 0 419 787 | B1 | 4/1991 |
| EP | 0 724 116 | A2 | 7/1996 |
| EP | 1 126 221 | A1 | 8/2001 |
| EP | 1 199 520 | A1 | 4/2002 |
| WO | WO 99/47874 | A1 | 9/1999 |
| WO | WO 02/25173 | A1 | 3/2002 |
| WO | WO 02/25197 | A1 | 3/2002 |

* cited by examiner

*Primary Examiner*—Michael Cuff
*Assistant Examiner*—Phutthiwat Wongwian

(57) ABSTRACT

The invention relates to a heat shield block, particularly for lining a combustion chamber wall, with a hot side that can be subjected to the action of hot medium and with a wall side situated opposite the hot side. A core area, which has a core material, extends inside the heat shield block from the hot side to the wall side. The core area is surrounded by an edge area with an edge material whose heat conductivity is lower than that of the core material. This targeted thermal insulation in the edge area provided in the form of a material bond between the core material and the edge material renders the heat shield block particularly unsusceptible to the formation and growth of cracks in the core area on the hot side. The invention also relates to a combustion chamber provided with heat shield blocks of the aforementioned type, and to a gas turbine provided with a combustion chamber comprising such a heat shield block.

17 Claims, 3 Drawing Sheets

HEAT SHIELD BLOCK FOR LINING A COMBUSTION CHAMBER WALL, COMBUSTION CHAMBER AND GAS TURBINE

CROSS REFERENCE TO RELATED APPLICATIONS

This application is the US National Stage of International Application No. PCT/EP2004/008357, filed Jul. 26, 2004 and claims the benefit thereof. The International Application claims the benefits of European Patent application No. EP03019093.8 filed Aug. 22, 2003. All of the applications are incorporated by reference herein in their entirety.

FIELD OF THE INVENTION

The invention relates to a heat shield block, in particular for lining a combustion chamber wall, having a hot side that can be impinged upon by a hot medium and a wall side situated opposite the hot side, and having a core area which extends from the hot side to the wall side and has a core material. The invention relates further to a combustion chamber having an inner combustion chamber lining and to a gas turbine.

BACKGROUND OF THE INVENTION

A thermally and/or thermo-mechanically highly stressed combustion space such as, for instance, a furnace, a hot gas duct or a combustion chamber in a gas turbine in which space a hot medium is produced and/or ducted is provided with a suitable lining as a protection against excessive thermal stressing. Said lining consists usually of a heat-resistant material and protects a wall of the combustion space from direct contact with the hot medium and the heavy thermal stressing associated therewith.

U.S. Pat. No. 4,840,131 relates to the securing of ceramic lining elements to a wall of a furnace or kiln, with a system of rails being secured to said wall. The lining elements are rectangular in shape with a planar surface and consist of a heat-insulating, fireproof, ceramic fibrous material.

U.S. Pat. No. 4,835,831 relates likewise to the affixing of a fireproof lining to a furnace wall, in particular a vertically arranged wall. A layer consisting of glass, ceramic, or mineral fibers is affixed to the metallic wall of the furnace. Said layer is secured to the wall by means of metallic hook members or by adhesive means. Wire netting having . . . —shaped meshing is affixed to said layer. The meshed netting serves also to prevent the ceramic-fiber layer from dropping. An even, closed surface of fireproof material is additionally applied secured by means of a bolt. The rebounding of fireproof particles formed during spraying, as would occur were the fireproof particles sprayed onto the metallic wall directly, will substantially be avoided as a result of applying the method described.

A ceramic lining of the walls of thermally highly stressed combustion spaces, for example of gas turbine combustion chambers, is described in EP 0 724 116 A2. The lining consists of wall elements made of high-temperature resistant structural ceramic material such as, for example, silicon carbide (SeC) or silicon nitrite ($Si_3N_4$). The wall elements are fastened mechanically and resiliently to a metallic supporting structure (wall) of the combustion chamber by means of a central fastening bolt. A thick thermal insulating layer is provided between the wall element and the wall of the combustion space so that the wall element is correspondingly distanced from the wall of the combustion chamber. The insulating layer, which is about three times as thick as the wall element, consists of ceramic fibrous material prefabricated in blocks. The wall elements can be accommodated in terms of their dimensions and external shape to the geometry of the space requiring to be lined. Another kind of lining for a thermally highly stressed combustion space is described in EP 0 419 787 B1. The lining consists of heat shield elements secured mechanically to a metallic wall of the combustion space. The heat shield elements are in direct contact with the metallic wall. To avoid excessive heating of the wall resulting from, for instance, a direct transfer of heat from the heat shield element or the ingress of hot medium into the gaps formed by the mutually abutting heat shield elements, the space formed by the wall of the combustion space and the heat shield element is exposed to cooling air, termed barrier air. Said barrier air prevents hot medium from penetrating as far as the wall and simultaneously cools the wall and the heat shield element.

WO 99/47874 relates to a wall segment for a combustion chamber and to a combustion chamber of a gas turbine. Described therein is a wall segment for a combustion chamber, which can be impinged upon by a hot fluid, for example a hot gas, having a metal support structure and a heat protection element secured thereon. Fitted between said metal support structure and said heat protection element is a deformable separating layer whose purpose is to absorb and compensate for possible relative movements of the heat shield element and support structure. Such relative movements can be caused, for example, in the combustion chamber of a gas turbine, in particular an annular combustion chamber, by the materials used having different thermal expansion characteristics or by pulsations in the combustion area that can occur in the event of irregular combustion to produce the hot working medium or as a result of resonant effects. At the same time the separating layer results in the relatively inelastic heat protection element overall lying flatter on the separating layer and metallic support structure because the heat protection element penetrates in places into the separating layer. The separating layer can thus also compensate for irregularities, due to production effects, on the support structure and/or heat protection element, which can lead to the disadvantageous introduction of forces at specific points, locally.

Particularly in the case of walls of high-temperature gas reactors such as, for example, gas turbine combustion chambers operated under pressure, their supporting structures have to be protected by means of suitable combustion chamber linings against an attack by hot gas. Owing to their high temperature stability, corrosion resistance, and low thermal conductivity, ceramic materials are ideal candidates for this compared to metallic materials. Owing to thermal expansion properties that are typical of materials and cause movement in the presence of differences in temperature (ambient temperature when stopped, maximum temperature when fully loaded) typically occurring during operation, the thermal mobility of ceramic heat shields resulting from temperature-dependent expansion has to be accommodated to obviate the occurrence of thermal stress which obstructing expansion causes and can lead to component destruction. This can be achieved by lining the wall requiring to be protected from hot gas attack with a plurality of individual, size-limited ceramic heat shields, for example heat shield blocks made of fireproof ceramic: As already discussed above in connection with EP 0 419 487 B1, suitable expansion gaps which, as explained, must for safety reasons never be completely closed even in the hot condition must be provided between the individual ceramic heat shield elements. It must at the same time be ensured that the hot gas does not excessively heat the supporting wall structure via the expansion gap. The simplest and surest way to avoid this in a gas turbine combustion chamber is to flush the expansion gap with air, by a process termed barrier-air cooling. The air required in any event for cooling mounting elements for the ceramic heat shields can be used for that purpose.

WO 02/25173 A1 discloses a heat shield brick, in particular for lining a combustion chamber wall, comprising a hot side that can be exposed to a hot medium, a wall side that lies opposite the hot side, and a peripheral side that lies adjacent to the hot side and the wall side and that has a peripheral lateral face. A tensioning element, pre-stressed in the peripheral direction, is provided on the peripheral side, whereby a compressive stress is generated perpendicularly to the peripheral lateral face. Extremely efficient and long-lasting protection for a heat shield brick is indicated thereby. The tensioning element is pre-stressed in the peripheral direction, whereby a certain compressive stress is generated perpendicularly to the peripheral lateral face. The heat shield brick is secured by this normal force, which is directed toward the interior of the heat shield brick at its center, even when the normal forces are very small. An incipient crack in the material, resulting from, for instance, impact loading, will be effectively counteracted thereby. Given a suitably arranged and embodied tensioning element, any incipient cracks present in the material will not, or only to a limited extent, be able to develop further or expand. The tensioning element holds the heat shield brick together, as it were, and protects it on the one hand from incipient cracking and, on the other, primarily from cracking through completely. The danger of smaller or larger fragments becoming loose or dropping out in the possible event of complete cracking through is additionally effectively counteracted.

SUMMARY OF THE INVENTION

The object of the invention is to disclose a heat shield block ensuring a high level of operational reliability and long tool life in terms both of unrestricted thermal expansion and of its resistance to a hot gas attack. Further objects of the invention are to disclose a combustion chamber having an inner combustion chamber lining and to disclose a gas turbine having a combustion chamber.

The object relating to the heat shield block is inventively achieved by means of a heat shield block, in particular for lining a combustion chamber wall, having a hot side that can be impinged upon by a hot medium and a wall side situated opposite the hot side, and having a core area which extends from the hot side to the wall side and has a core material, with the core area being surrounded by an edge area having an edge material whose thermal conductivity is lower than the core material's.

The invention already proceeds here from the knowledge that as a result of the air current cooling the edges of the heat shield block and flowing through the gap between the heat shield blocks and of the transfer of heat to the hot side of the heat shield block as a result of the impinging thereon of hot gas, a three-dimensional temperature distribution will in individual cases occur within the heat shield block. This is characterized by a drop in temperature from the hot side to the wall side and, as a result of the barrier-air cooling of the edges ("edge cooling"), from central points in the ceramic heat shield block toward the cooled edges. In the case of heat shield blocks typically flat parallel to the hot side or, as the case may be, wall side the temperature gradient perpendicular to the wall-side surface will result in comparatively only slight thermal stresses provided nothing impedes the thermally induced arching of the heat shield block in its mounted condition. Conversely, a temperature gradient that is parallel—proceeding from an edge toward an inner area of the heat shield block—to the wall side will result very readily in increased thermal stresses owing to the mechanical rigidity of plate-like geometries in terms of deformations parallel to their size-projection areas. Owing to their comparatively low thermal expansion, cold edges are here put under tension by hotter central areas, which undergo greater thermal expansion; that can lead to the formation of cracks, starting at the edges of the heat shield block, if the material's strength is exceeded.

The invention discloses a totally novel concept, in particular for avoiding a failure of the heat shield block ensuing from the problem of crack formation starting at the edges of the heat shield block. In doing so the invention makes use of the knowledge that thermally induced tensile stresses as a rule only occur where there are temperature gradients. If temperature gradients starting at the edges of the heat shield block are prevented from penetrating deep into the interior of the heat shield block, any cracks occasioned thereby will only be able to penetrate to a limited extent or, as the case may be, cracks will not form at all. Short cracks that start at the edges and extend only slightly toward the interior of the heat shield block will be tolerated because they will not impair the functioning capability of the heat shield block either theoretically or as shown by practical experience.

The invention provides a heat shield block whose thermal conductivity is selectively set locally for avoiding the formation and growth of cracks. The core area is or for this purpose surrounded by an edge area having an edge material whose thermal conductivity is lower than the core material's. A two-material heat shield block is therefore disclosed having thermal insulation in the edge area which, owing to the targeted choice of material for the edge material, has reduced thermal conductivity compared to the core material. The core area and edge area are herein integral parts of the heat shield block so that a heat shield block is provided having thermal conductivity that can be varied via its volume. What is achieved by having the greater thermal conductivity in the core area is that a temperature profile that is approximately balanced parallel to the hot side arises in the core area. The core area thus remains substantially free of thermal stress. Temperature gradients and thermal stresses associated therewith occur only in the edge area.

The edge area herein advantageously also includes the outer edges of the heat shield block so that, owing to the lower thermal conductivity compared to the core area, these act as thermal insulation or, as the case may be, an insulating area. It is of particular advantage herein that the length of cracks due to thermal stresses is shortened because such cracks are limited to the edge area, as a result of which the heat shield block is stabilized in terms of crack formation.

In a preferred embodiment of the heat shield block the thermal conductivity of the edge material is less than 60%, in particular less than 50%, of the thermal conductivity of the core material. The heat shield block is accordingly embodied in such a way that a significant drop in thermal conductivity can be observed at the transition from the core area to the edge area. The edge area acts therein as thermal insulation surrounding the core area. The edge area therein advantageously encloses the core area directly, with a materially coherent bond being realized from the core material and edge material.

The edge material is preferably porous, with the porosity of said material being selectively set in such a way that the thermal conductivity of the edge material is thereby reduced compared to that of the core material. Via the density distribution and size distribution of the pore structure of the edge material, the thermal conductivity can be selectively set in the edge area depending on what is required during loading. Where applicable, varying of the local thermal conductivity can also be achieved within the edge area by appropriately varying the pore size and pore diameter distribution.

In a particularly preferred embodiment the core material and edge material are formed from the same ceramic base material, in particular a fireproof ceramic material. Particularly good material coherence between the core material and edge material can be achieved through said material identicality of the base material. The admixing of pore-forming materials with the base material while the heat shield block is being produced can, for example, be provided to achieve the desired porous structure within the edge area, with said pore-forming material being advantageously pressed or poured into the area close to the edge, which is to say into the edge area of the block being produced. The pore-forming material evaporates during sintering, leaving behind the pores that will appropriately reduce the base material's effective thermal conductivity. Said pore-forming material is preferably not applied to the core area so that the desired reduction in thermal conductivity at the transition from the core area to the edge area will result.

In an advantageous embodiment the axial extent of the edge area along the hot side of the heat shield block is less than 20%, in particular between around 5% and 10%, of the total axial extent of the heat shield block. The heat shield block is in particular provided at all edges that are included in the edge area and have low thermal conductivity differing from the core material's with a reduction in thermal conductivity compared to that of the core area to less than 50% of the core material's thermal conductivity at a spacing somewhat less than 10% of the respective overall extent (support length).

The edge area preferably extends from the hot side to the wall side. The core area is in this embodiment fully encompassed around its circumference by the edge area so that fully circumferential thermal insulation of the core area is achieved with material coherence being realized between the core material and edge material.

The heat shield block preferably has a peripheral side which abuts the hot side and wall side and has a peripheral lateral face formed at least partially from the edge material. In an arrangement of a plurality of heat shield blocks required for lining a combustion chamber wall the gaps between the heat shield blocks are at least partially limited by the edge material on the peripheral lateral face. The peripheral lateral face is advantageously formed completely by the core material so that as good as possible thermal insulation of the core material is provided.

The heat shield block consists preferably of a ceramic base material, in particular a fireproof ceramic material. Choosing a ceramic as the base material for the heat shield block means the heat shield block can safely be used up to very high temperatures, with oxidative and/or corrosive attacks such as occur when the hot side of the heat shield block is impinged upon by a hot medium, for example a hot gas, being at the same time very substantially non-damaging for the heat shield block. This is of particularly major advantage when the heat shield block is used in a combustion chamber because the heat shield block's heat shield function will continue to be maintained even after incipient cracking of the material in the edge area; in particular failure of the heat shield block, for example its complete breakage, will be reliably avoided so that no fragments will be able to reach into the combustion chamber, either.

In economic terms the advantage ensuing therefrom is, on the one hand, that no extraordinary maintenance and/or inspecting of a combustion chamber having the heat shield block will be required in cases of normal operation; on the other hand, in the event of exceptional incidents the heat shield block has emergency running properties so that consequential damage to a turbine, for example to its blade assembly, can be avoided since crack spreading will extensively be prevented thanks to the selective setting of the thermal conductivity in different areas of the heat shield block.

The combustion chamber can be operated applying at least the customary maintenance cycles, moreover with the exposure times being extendible owing to the lower tendency for cracks to spread.

The object relating to a combustion chamber is inventively achieved by means of a combustion chamber having an inner combustion chamber lining having the heat shield blocks according to the explanations.

The object relating to a gas turbine is inventively achieved by means of a gas turbine having a combustion chamber of said type.

The advantages of a combustion chamber of said type or a gas turbine of said type emerge in keeping with the explanations pertaining to the heat shield block.

BRIEF DESCRIPTION OF THE DRAWINGS

The invention is explained in more detail in an exemplary manner with reference to the drawings, in which, in a schematic and in part simplified representation.

Identical parts are provided with the same reference numerals in all the figures.

DETAILED DESCRIPTION OF THE INVENTION

Figure 1:
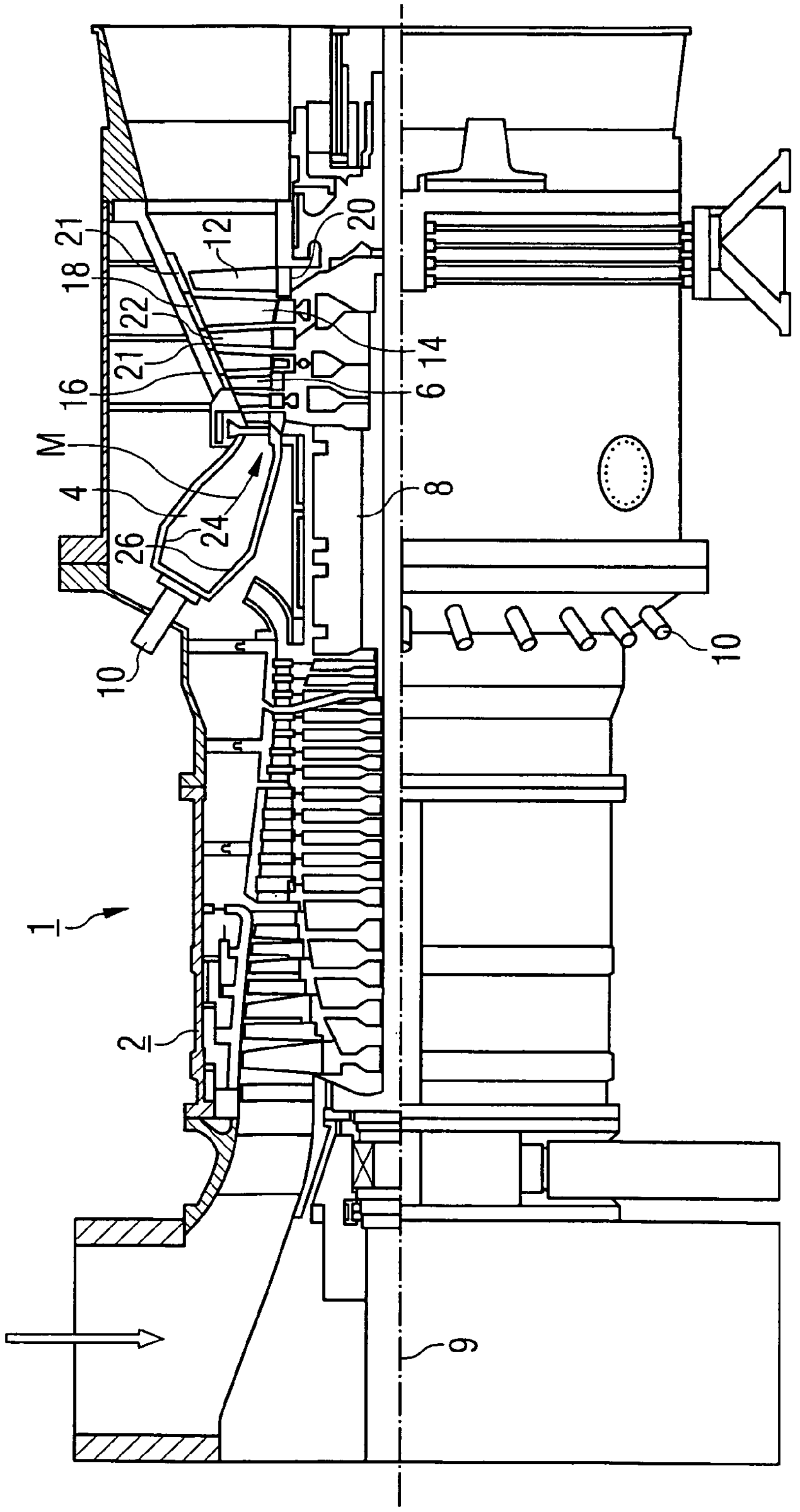
FIG. 1 is a cross-sectional view of a gas turbine.

The gas turbine 1 according to FIG. 1 has a compressor 2 for combustion air, a combustion chamber 4, and a turbine 6 for driving the compressor 2 and a generator (not shown), or a production machine. The turbine 6 and the compressor 2 are for this purpose located on a common turbine shaft 8, referred to also as a rotor disk, to which the generator or, as the case may be, production machine is also linked and which is mounted to be rotatable around its central axis 9. The combustion chamber 4 embodied in the manner of an annular combustion chamber is fitted with a number of burners 10 for burning a liquid or gaseous fuel.

The turbine 6 has a number of rotor blades 12 linked to the turbine shaft 8. The rotor blades 12 are arranged in a ring around the turbine shaft 8, thereby forming a number of rotor blade rows. The turbine 6 further includes a number of fixed guide vanes 14 attached, likewise in a ring, to the inner housing 16 of the turbine 6 and forming guide vane rows. The rotor blades 12 therein serve to drive the turbine shaft 8 by means of the transfer of pulses from the hot medium—the working medium M—flowing through the turbine 6. The guide vanes 14 serve, conversely, to duct the flow of the working medium M between in each case two sequential rotor blade rows or rotor blade rings viewed in the flow direction of the working medium M. A sequential pair comprising a ring of guide vanes 14 or guide vane row and a ring of rotor blades 12 or rotor blade row is therein referred to also as a turbine stage.

Each guide vane 14 also has a platform 18, referred to also as a vane root, which is arranged on the inner housing 16 of the turbine 6 as a wall element for securing the respective guide vane 14. The platform 18 is therein a thermally comparatively highly stressed structural component forming the outer limit of a hot gas duct for the working medium M flowing through the turbine 6. Each rotor blade 12 is analogously secured to the turbine shaft 8 via a platform 20 referred to also as a blade root.

A guide ring 21 is in each case arranged between the platforms 18, arranged spaced apart, of the guide vanes 14 of two adjacent guide vane rows. The outer surface of each guide ring 21 is therein likewise exposed to the hot working medium M flowing through the turbine 6 and spaced in a radial direction from the outer end 22 of the rotor blade 12 situated opposite it by means of a gap. The guide rings 21 arranged between adjacent guide vane rows serve therein in particular as covering elements that protect the inner wall 16 or other housing mounting parts from excessive thermal stressing by the hot working medium M flowing through the turbine 6. The combustion chamber 4 is limited by a combustion chamber housing 29, with a combustion chamber wall 24 being formed on the combustion chamber side. In an exemplary embodiment the combustion chamber 4 is embodied as what is termed an annular combustion chamber in which a plurality of burners arranged peripherally around the turbine shaft 8 discharge into a common combustion chamber space. The combustion chamber 4 is for this purpose embodied in its totality as a ring-shaped structure positioned around the turbine shaft 8.

The combustion chamber 4 is designed for a comparatively high temperature of the working medium M of approximately 1,200° C. to 1,500° C. in order to achieve a comparatively high level of efficiency. To enable comparatively long operating times even given these operating parameters that are unfavorable for the materials, the combustion chamber wall 24 is provided on its side facing the working medium M with a combustion chamber lining formed from heat shield blocks 26. To ensure that the structure of the combustion chamber 4 embodied as an annular combustion chamber will be stable in the presence of hot gas, the combustion chamber lining is provided with a plurality of heat shield blocks 26 having high-temperature stability so that a full-coverage, extensively leak-free combustion chamber lining is formed in the annulus in this way.

Figure 2:
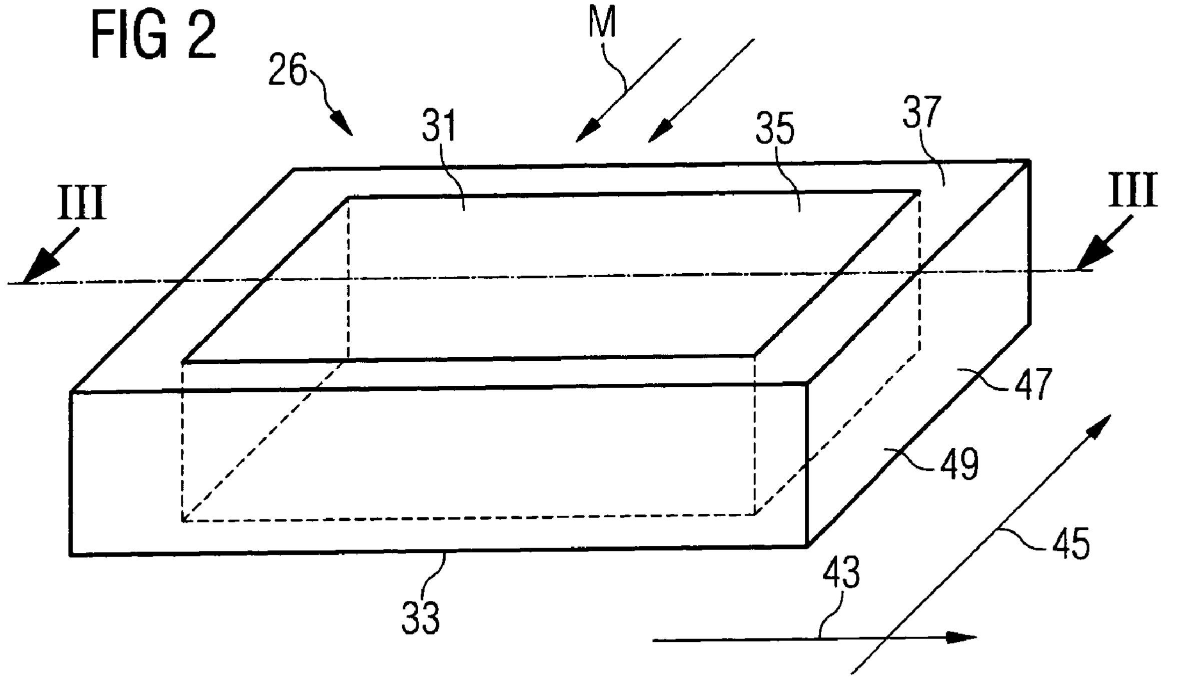
FIG. 2 is a perspective view of a heat shield block.

FIG. 2 is a perspective view of a heat shield block 26 as embodied in particular for lining a combustion chamber wall 24 according to the invention. The combustion chamber block 26 has a cuboidal or cube-like geometry and extends along a longitudinal axis 43 and a transverse axis 45 running substantially perpendicular to the longitudinal axis 43. The heat shield block 26 has a hot side 35 that can be impinged upon by the hot medium M and a wall side 33 situated opposite the hot side 35. A core area 31 having a core material 39 extends from the hot side 35 to the wall side 33 through the interior of the heat shield block 26. The core area 31 is surrounded by an edge area 37 having an edge material 41, with the thermal conductivity of the edge material 41 being lower than that of the core material 39. The edge area 37 encloses the core area 31 throughout its circumference along the edges of the cuboidal or cube-like heat shield element 26. The transition from the core material 39 in the core area 31 to the edge material 41 in the edge area 37 takes place materially cohesively. The thermal conductivity of the edge material 41 is less than 50% that of the core material 39. This ensures that a temperature profile that is approximately balanced parallel to the hot side 35 will arise in the core area when the heat shield block 26 is used in a combustion chamber 4 of a gas turbine 1 (see FIG. 1). The core area 31 will remain substantially free of thermal stress as a result of the thermal insulation effect of the edge area 37 having the reduced thermal conductivity. Temperature gradients and thermal stresses associated therewith will consequently occur only in the edge area 37 or almost exclusively there, which is to say near the edges of the heat shield block 26. The length of any cracks occurring owing to thermal stresses will hence be shortened and limited to the edge area 31, and the heat shield block 26 will be stabilized overall in terms of the formation and spreading of cracks compared to conventional embodiments.

Figure 3:
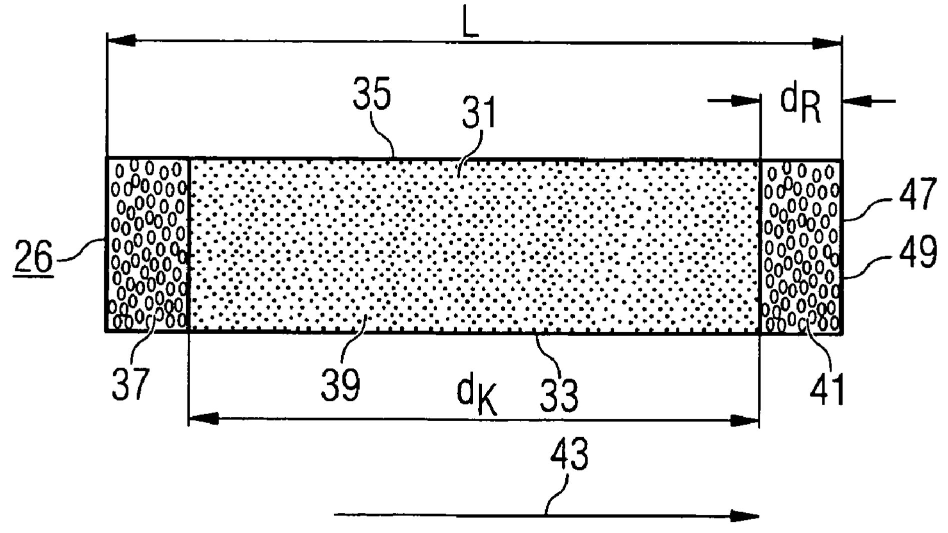
FIG. 3 is a sectional view of the heat shield block shown in FIG. 2 along the intersection III-III.

FIG. 3 is a sectional view along the intersection III-III of the heat shield block 26 shown in FIG. 2. Shown therein is a view of the heat shield block 26 in the direction of the transverse axis 45 onto the cutting plane. The core area 31 is cuboidal or cube-like. The edge area 37 surrounds the core area 31 throughout its circumference, with the edge area 31 extending from the hot side 35 to the wall side 33. The edge area 37 consists of an edge material 41, with the peripheral lateral face 49 having the edge material 41. The peripheral lateral face 49 is therein the outermost limiting area of the peripheral side 47, which abuts the hot side 35 and the wall side 33. In order to set a reduced thermal conductivity in the edge area 41 compared to the core area 31, the edge material 41 is embodied as porous material having a plurality of pores, with the porosity of the edge material 41 being selectively set in such a way that the thermal conductivity of the edge material 41 is thereby reduced compared to that of the core material 39 to a desired level. The thermal conductivity of the edge material 41 is, for example, less than 60%, in particular less than 50%, of that of the core material 39. The core material 39 and the edge material 41 can herein be formed, for example, from the same ceramic base material, in particular a fireproof ceramic material. A particularly firm material bond having a long service life is realized through said material identicality of the base material for the core material 39 and the edge material 41.

A desired porosity for reducing the thermal conductivity in the edge area 37 is set by, for example, admixing suitable pore-forming materials with the ceramic compound, with the pore-forming materials being pressed or poured into the area of the block being produced that is near the edge and defined by the edge area 37. The pore-forming material evaporates during sintering, leaving behind pores having a pre-determined pore diameter distribution and pore density distribution within the edge area 37. The heat shield block 26 will hence be provided in its edge area 37 with lower thermal conductivity differing from that of the core material 39, for example with a lowering of the thermal conductivity to less than 50% of that of the core material 39. Along the hot side 35 the axial extent $d_R$ of the edge area 37 is therein less than 20%, in particular between around 5% and 10%, of the total axial extent L of the heat shield block 26. The axial extent $d_K$ of the core area 31 having the core material 39 is in this embodiment consequently significantly greater than the axial extent $d_R$ of the edge area 37. The advantages of the core material 39 in the core area 31 in terms of resistance to high-temperature stressing and the impinging thereon of a hot medium M, for example a hot gas, will hence be substantially retained, with the formation of cracks in particular on the hot side 35 in the core area 31 being substantially suppressed, thanks to the thermal insulation effect of the porous edge material 41, even in conditions of high-temperature or thermal shock stressing. Cracks can, at most, form or spread in the edge area 37, where this can be tolerated.

Figure 4:
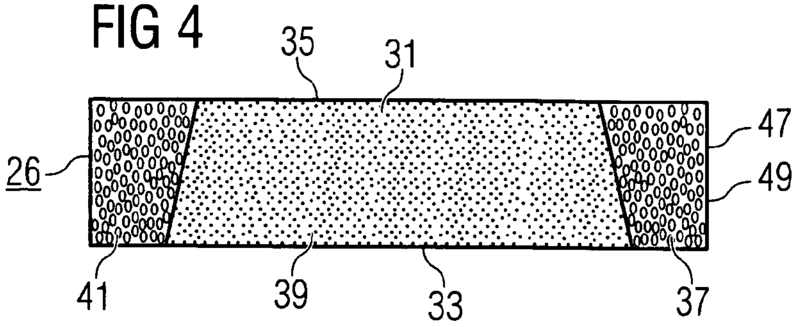
FIGS. 4 to 7 show different embodiments of a heat shield block having a core area and an edge area.
Figure 5:
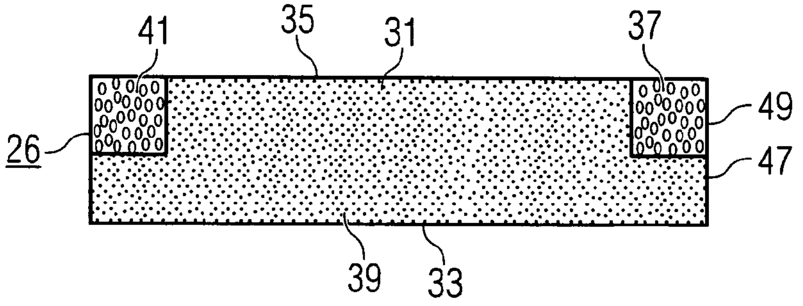

FIGS. 4 to 7 show further embodiments of the heat shield block 26 having a modified geometry of the heat shield block 26 (see FIGS. 6 and 7) or, as the case may be, having a variation of the geometry of the core area 31 and edge area 37. FIG. 4 is a sectional view of a heat shield block 26 having an edge area 37 extending from the hot side 35 to the wall side 33, with the cross-section of the edge area 37 narrowing toward the wall side 33. The cross-section of the core area 31 correspondingly continuously broadens from the hot side 35 toward the cold side 33. In contrast to this, FIG. 5 shows an exemplary embodiment of the heat shield block 26 in which the edge area 37 having the edge material 41 forms a partial area of the peripheral lateral face 49. The edge area 37 faces the hot side 35 and is at the same time a constituent part of the hot side 35. The peripheral lateral face 49 has both the core material 39 and the edge material 41, with the edge material 41 facing the hot side 35 and the core material 39 facing the wall side 33. Depending on the stress to which the heat shield block 26 is exposed and is typical of a particular application, both the geometry of the edge area 37 and core area 31 and the local thermal-conducting properties in the edge area 37 can be modified and adjusted by setting an appropriate porosity of the edge material 41 in the edge area 37.

Figure 6:
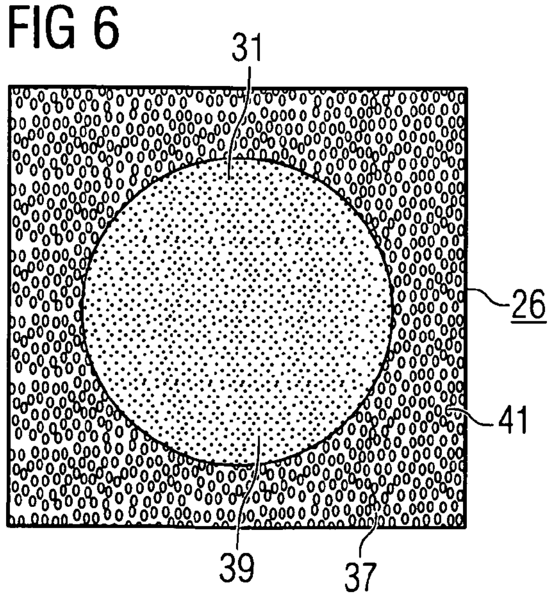
Figure 7:
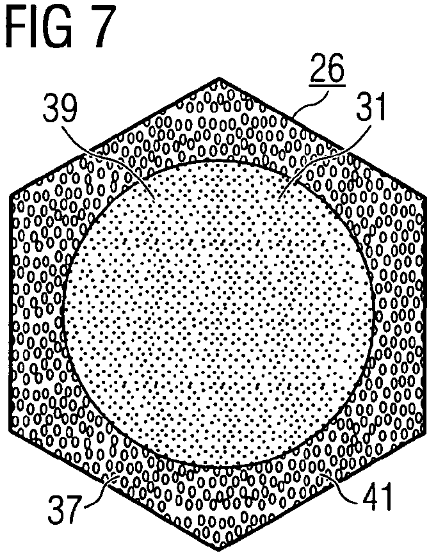

FIGS. 6 and 7 show different geometries of the heat shield block 26 in a plan view onto the hot side 35. The geometry of the core area 31 is in both exemplary embodiments substantially cylindrical and extends from the hot side 35 to the cold side 33. The outer boundary of the heat shield element 26 exhibits square geometry in FIG. 6 and hexagonal geometry in FIG. 7. The edge area 37 is substantially a complementary volume to the cylindrical core area 31. For thermal insulation purposes the edge material 41 has a porosity so that a thermal conductivity significantly reduced compared to that of the core area 31 is achieved in the edge area 37. The core material 39 and the edge material 41 consist of identical base material or substantially similar base material so that the transition from the core area 31 to the edge area 37 is achieved in the form of a materially cohesive, extensively homogenous material bond which, although chemically identical or similar, will nonetheless cause the desired reduction in thermal conductivity from the core area 31 to the edge area 37 owing to the physical effect of the selectively set porosity of the edge material 41.

The invention claimed is:

1. A heat shield block for lining a combustion chamber wall, comprising:

a hot surface exposed to a combustion gas; a wall surface arranged opposite the hot surface;

a core portion comprising a core material and extending from the hot surface to the wall surface; and an edge portion comprising a porous edge material surrounding a circumference of the core portion, the thermal conductivity of the edge material determined by a pore size and density distribution of the edge material, the thermal conductivity of the edge material being less than the thermal conductivity of the core material, wherein a thermal conductivity of the core portion and a thermal conductivity of the edge portion are determined such that the core portion remains substantially free of thermal stresses during operation.

2. The heat shield block as claimed in claim 1, wherein the thermal conductivity of the edge material is less than 60% of the thermal conductivity of the core material.

3. The heat shield block as claimed in claim 1, wherein the thermal conductivity of the edge material is less than 50% of the thermal conductivity of the core material.

4. The heat shield block as claimed in claim 1, wherein the core material and the edge material are formed from the same ceramic material.

5. The heat shield block as claimed in claim 1, wherein the core material and the edge material are formed from a fire-proof ceramic material.

6. The heat shield block as claimed in claim 1, wherein the core material and the edge material form a cohesive bond.

7. The heat shield block as claimed in claim 1, wherein the axial length of the edge portion is less than 20% of the entire axial length of the block along the hot surface.

8. The heat shield block as claimed in claim 1, wherein the axial length of the edge portion is between 5% and 10% of the entire axial length of the block along the hot surface.

9. The heat shield block as claimed in claim 1, wherein the edge portion extends from the hot surface to the wall surface.

10. The heat shield block as claimed in claim 1, wherein a peripheral surface adjacent to the hot surface and the wall surface is partially formed from the edge material.

11. A heat shield block for lining a combustion chamber wall, comprising:

a three dimensional core portion, comprising:

a core hot surface comprising a core material and exposed to a combustion gas, a core wall surface arranged opposite the core hot surface, a plurality of core peripheral surfaces arranged between an edge of the core hot surface and the core wall surface; and a three dimensional edge portion surrounding and enclosing an entirely of the peripheral surfaces of the core portion but not surrounding and enclosing the core hot surfaces and core wall surfaces, comprising:

an outer hot surface comprising a porous material adapted for exposure to the hot medium, the outer hot surface coplanar and abutting with the core hot surface, an outer wall surface arranged opposite the outer hot surface, the outer wall surface coplanar and abutting with the core wall surface, a plurality of inner core peripheral surfaces in contact with the core peripheral surfaces and arranged between the edges of the outer hot surface and the core wall surface, wherein a thermal conductivity of the core portion and a thermal conductivity of the edge portion are selected such that the core portion remains substantially free of thermal stresses during operation.

12. The heat shield block as claimed in claim 11, wherein the thermal conductivity of the porous material is a function of a pore size distribution and a pore density distribution within the porous material.

13. The heat shield block as claimed in claim 11, wherein thermal conductivity of the porous material is less than 60% of the thermal conductivity of the core material.

14. The heat shield block as claimed in claim 11, wherein the core material and the porous material are formed from the same ceramic material.

15. The heat shield block as claimed in claim 11, wherein the axial length of the exterior portion is less than 20% of the entire axial length of the block along the surface exposed to the hot medium.

16. An annular combustion chamber for use in a gas turbine engine, comprising:

a combustion chamber housing;

a plurality of burners arranged peripherally around a turbine shaft of the engine and contained by the chamber housing;

a combustion chamber wall formed on an interior side of the combustion chamber;

an inner combustion chamber lining having a plurality of heat shield blocks comprising a block material having a core material and an edge material that surrounds throughout a circumference of the core material, the thermal conductivity of the edge material being less than 60% of the thermal conductivity of the core material as determined by a porosity of the core material and a porosity of the edge material such that the core material remains substantially free of thermal stresses during operation.

17. The annular combustion chamber as claimed in claim 16, wherein the core material and the edge material are formed from the same ceramic material.

* * * * *